United States Patent Office 2,839,835
Patented June 24, 1958

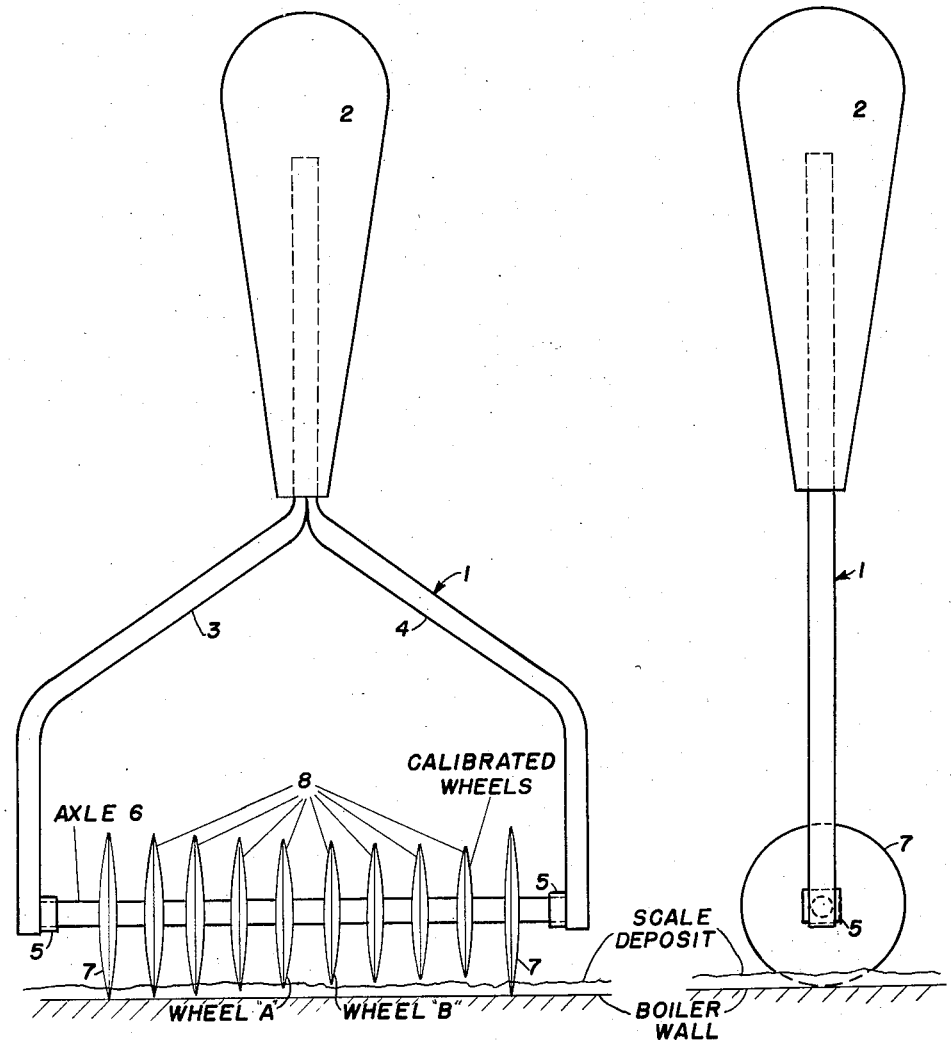

2,839,835
MEASURING DEVICE

William J. Zollinger, Crystal Lake, Ill., assignor to The Pure Oil Company, Chicago, Ill., a corporation of Ohio Application September 25, 1956, Serial No. 611,847

4 Claims. (Cl. 33—169)

This invention relates to a device for measuring depth of scale or deposit on a smooth surface, and is more particularly concerned with a device for measuring such deposits on the inside surfaces of closed vessels, such as boilers.

It is well-known that water heating boilers, oil distilling vessels and similar types of equipment accumulate deposits of scale, carbonaceous or other material on the inside surface. It is desirable to determine from time to time the thicknesses of these deposits since they detract from the efficiency of the equipment and must be removed when they become too heavy. In many cases it is not possible to readily determine the thickness of such deposits because the only access to the interior of the vessel is by means of a small hand-hold.

An object of my invention is to provide a device for easily and quickly determining thickness of deposits on smooth surfaces. Another object of the invention is to provide a device which makes possible the measurement of thickness of deposits on the inner walls of vessels which cannot be visually inspected. Other objects of the invention will manifest themselves from the following detailed description and accompanying drawing, of which Figure 1 is a front elevational view of a device constructed in accordance with my invention; and Figure 2 is a side elevational view of the device shown in Figure 1.

Referring to the drawing, number 1 is a frame or holder, the upper end of which extends into handle 2 and the lower end of which is bifurcated, having two legs 3 and 4. On the end of each leg is mounted fixed hub 5, between which is mounted rotatable axle 6. The frame is preferably made of metal rod stock or wire of sufficient thickness so that it will not readily bend.

Mounted inside hubs 5 on axle 6, adjacent the ends of the axle, are guide wheels 7. The guide wheels are fastened securely to the axle and rotate therewith. Between the two guide wheels 7 are a plurality of measuring wheels or discs 8 of gradually decreasing diameter, rigidly fastened to the axle. The guide wheels as well as the measuring wheels or discs are made of relatively hard metal, such as steel, with sharpened edges in order to assure penetration of the deposit which is to be measured. The guide wheels as well as the measuring wheels should be sufficiently thick to prevent distortion or bending during use.

The device may be made in any suitable size, depending on the size of the opening through which the deposits are accessible. The device shown in the drawing represents an enlarged model which is useful for measuring deposits in a vessel to which the only access is a hand-hole. In this device the axle may be approximately 2" long with a set of 8 measuring wheels spaced apart at intervals of about 3/16" with each measuring wheel differing from its adjacent wheels by an amount equal to 1/64" in diameter. Thus, in the device shown in the drawing in Figure 1, the guide wheels will be approximately 3/4" in diameter. The largest measuring wheel or disc will be 47/64" in diameter and the smallest measuring wheel will be 40/64" in diameter. With a device of this size it is possible to measure deposit thickness down to 1/128". It will be obvious, of course, that a larger number of measuring wheels can be used and that they may differ from each other in diameter by a greater or lesser amount than 1/64" where thicknesses greater than 1/16" are to be measured.

In order to use the device, it is grasped by the handle and inserted through the opening in the vessel. Guide wheels are placed firmly against the deposit and the wheels are rolled along the deposit until they penetrate to the inner surface of the vessel. The device is then withdrawn and the wheels are examined. If the deposit is sufficiently wet it will adhere to the surfaces of the measuring wheels which have penetrated the deposit to any extent. The deposit depth will be equal to the difference in radius between the guide wheels and the largest measuring wheel which shows no deposit on the surface of the wheel.

Where it is desired to measure deposits which are not sufficiently wet to leave a visible residue on the surface of the measuring wheels, the surface of the wheels may first be dusted with a powdery material, such as talc or flour, which will adhere in a thin film on the surface of the wheel. The powdery material will be rubbed off to the extent that the wheel penetrates the deposit and hence it can easily be observed which is the largest wheel which did not penetrate the deposit. Likewise, marks may be scribed at intervals on the surfaces of the wheels with chalk or other readily removable marking material to indicate the depth to which the wheels penetrate the deposit.

In order to facilitate determination of the depth of the deposit, each wheel may be marked adjacent its center with the depth which it is intended to measure. For example, the largest measuring wheel immediately adjacent the guide wheel may be marked 1/128". The smallest measuring wheel adjacent to the other guide wheel may be marked 1/16". It will be apparent that the difference in magnitude between adjacent wheels has been exaggerated in the drawing in order to more clearly illustrate the nature of the device.

The supporting frame may assume other shapes and the measuring wheels or discs may be mounted in an order different from that shown in the drawing. For example, the largest measuring disc may be mounted on the center of the axle with discs of gradually smaller diameter mounted on either side thereof.

It will, of course, be apparent that the device can be used to determine thickness of deposits on surfaces that are accessible to visual inspection, in which case the depth of the penetration of the measuring wheels can be observed and the thickness of the deposit thereby determined.

I claim as my invention:

1. A thickness measuring device for measuring liquid or solid deposits on a surface comprising a pair of spaced guide wheels rotatably mounted on an axle, a holder in which said axle is mounted, a plurality of spaced measuring wheels rotatably mounted on said axle between said guide wheels, said measuring wheels being of smaller diameter than said guide wheels and differing from each other in diameter, said guide and measuring wheels each having its entire periphery provided with a continuous sharp edge, and wheels being of a material of sufficient hardness to cut through the deposits being measured.

2. A device in accordance with claim 1 in which the axle is rotatably mounted in the holder and the guide wheels and measuring wheels are rigidly mounted on the axle.

3. A device in accordance with claim 2 in which the measuring wheels are mounted on the axle in order of gradually decreasing diameter.

4. A device in accordance with claim 1 in which the holder is bifurcated and the axle is mounted in hubs at the ends of the bifurcation.

References Cited in the file of this patent

UNITED STATES PATENTS

| | | |
|---|---|---|
| 1,909,652 | Bower | May 16, 1933 |
| 1,927,821 | Abbott | Sept. 26, 1933 |
| 2,507,592 | Euverard | May 16, 1950 |

FOREIGN PATENTS

| | | |
|---|---|---|
| 685,238 | Great Britain | Dec. 31, 1952 |